United States Patent [19]

Okada et al.

[11] Patent Number: 4,514,079
[45] Date of Patent: Apr. 30, 1985

[54] OPTICAL INPUT AND OUTPUT SCANNING SYSTEM

[75] Inventors: Kunihiro Okada, Nishitama; Hirohide Endo, Tokorozawa; Susumu Saito, Hachiohji; Kenji Kataoka, Kawagoe, all of Japan

[73] Assignees: Hitachi, Ltd.; Hitachi Koki Co., Ltd., both of Tokyo, Japan

[21] Appl. No.: 397,901

[22] Filed: Jul. 13, 1982

[30] Foreign Application Priority Data

Jul. 20, 1981 [JP] Japan .................. 56-112169

[51] Int. Cl.³ ............................................ F03G 15/04
[52] U.S. Cl. ........................................ 355/8; 358/285
[58] Field of Search ............. 355/3 R, 8, 11; 346/76 L, 108, 160; 358/285, 286, 300, 302, 206, 293, 294, 296; 350/6.8; 250/234

[56] References Cited

U.S. PATENT DOCUMENTS

| | | | |
|---|---|---|---|
| 3,898,627 | 8/1975 | Hooker et al. | 355/3 R X |
| 4,012,585 | 3/1977 | Chen | 346/108 X |
| 4,203,652 | 5/1980 | Hanada | 350/433 X |
| 4,268,868 | 5/1981 | Yokota et al. | 358/286 |
| 4,370,678 | 1/1983 | Kitamura | 358/302 X |

FOREIGN PATENT DOCUMENTS

| | | | |
|---|---|---|---|
| 0156652 | 10/1979 | Japan | 350/6.8 |
| 0147164 | 11/1981 | Japan | 355/14 R |

*Primary Examiner*—A. T. Grimley
*Assistant Examiner*—J. Pendegrass
*Attorney, Agent, or Firm*—Antonelli, Terry & Wands

[57] ABSTRACT

An optical input and output device which includes laser beam generating means, a photo-conductive drum to be formed with an electrolatent image according to the intensity of a laser beam, scanning means for simultaneously deflecting and distributing the laser beam between the surface of a sheet of paper written with a picture image to be received and the surface of the photo-conductive drum to irradiate and linearly scan the respective surfaces, and photoelectric converting means made receptive of the laser beam reflected from the paper surface thereby to convert it into an electric signal.

5 Claims, 3 Drawing Figures

OPTICAL INPUT AND OUTPUT SCANNING SYSTEM

BACKGROUND OF THE INVENTION

1. Field of the Invention

The present invention relates to an input and output device and, more particularly, to an image input and output device which is enabled by using both a laser beam source of a laser beam printer (which will be shortly referred to as a "laser printer") and an optical system therefor to have two functions of an image input device and an image output device (i.e., the laser printer).

2. Description of the Prior Art

The laser printer used widely in the prior art is enabled to have a function to scan a photo-conductive drum with a laser beam emitted from a laser beam source thereby to transfer the image formed on the drum surface to a sheet of printer paper. However, the laser printer does not have an image input function to photoelectrically convert the picture image on the paper thereby to feed the electric signals to a computer or the like.

SUMMARY OF THE INVENTION

It is, therefore, an object of the present invention to realize a multi-function type laser printer which basically has the construction of a laser printer according to the prior art but which is enabled by the use of the laser beam of the printer and an optical system therefor to additionally have an image input function.

In order to achieve the above-identified object, the present invention is characterized by the provision of, in addition of the construction of the laser printer of the prior art, both distributing optical means for distributing a laser beam between the surface of paper written with a picture image to be received and the surface of a photo-conductive drum for forming a picture image to be derived thereby to make it possible to simultaneously irradiate both the surfaces, and means for photoelectrically converting the light reflected from the paper surface.

DESCRIPTION OF THE PREFERRED EMBODIMENTS

First of all, in order to allow the present invention to be easily understood, the image output operation by the usual laser printer will be briefly described with reference to FIG. 1. (Incidentally, the detail of the respective portions of FIG. 1 should be referred to a reference "Extra Issue of Electronic Science, 1980, No. 2 pp. 87 to 90.)

Figure 1:
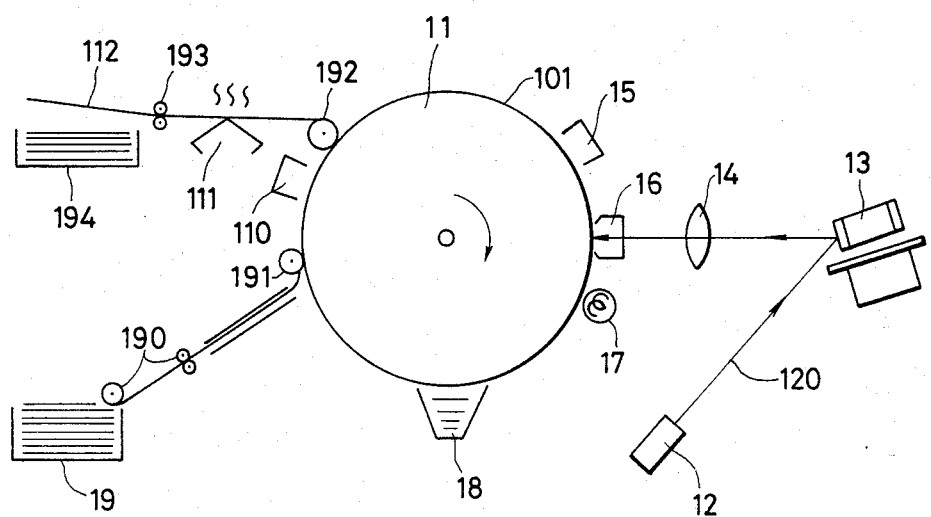
FIG. 1 is a schematic view showing the function of an image output operation by the usual laser printer.

The laser printer of FIG. 1 is divided into a laser, an optical system for scanning the former, and an image forming system for electrophotography. A laser beam 120 emitted from a laser beam source 12 is reflected and deflected by a polygon reflector 13, which is rotating in high precision, to axially scan the surface 101 (which will be shortly referred to as a "drum surface") of a photo-conductive drum 11. The optical differential path of the beam to an object is so corrected by an Fθ lens 14 that the laser beam may scan the drum surface 101 at an equal speed. The procedures of forming an image on the drum surface 101 will be described in the following. After the drum surface 101 has been positively charged by a primary charger 15, it is subjected to an AC corona discharge by an AC charger 16 and is imprinted thereon with the output latent image by the action of the laser beam. After the drum surface 101 has been uniformly irradiated by means of a lamp 17 to form an electrolatent image, this electrolatent image is visualized by a developer 18. The resultant visual image on the drum surface 101 is transferred onto such a sheet of paper 191 by applying a negative corona by means of a transfer charger 110 as has been conveyed from a paper feed cassette 19 by the action of paper feed rollers 190. That paper is separated from the drum surface by the action of a roller 192, and a developing agent is evaporated by a heater 111 to fix the toner. The paper 112 having its toner fixed is stacked through rollers 193 in a paper tray 194.

Figure 2:
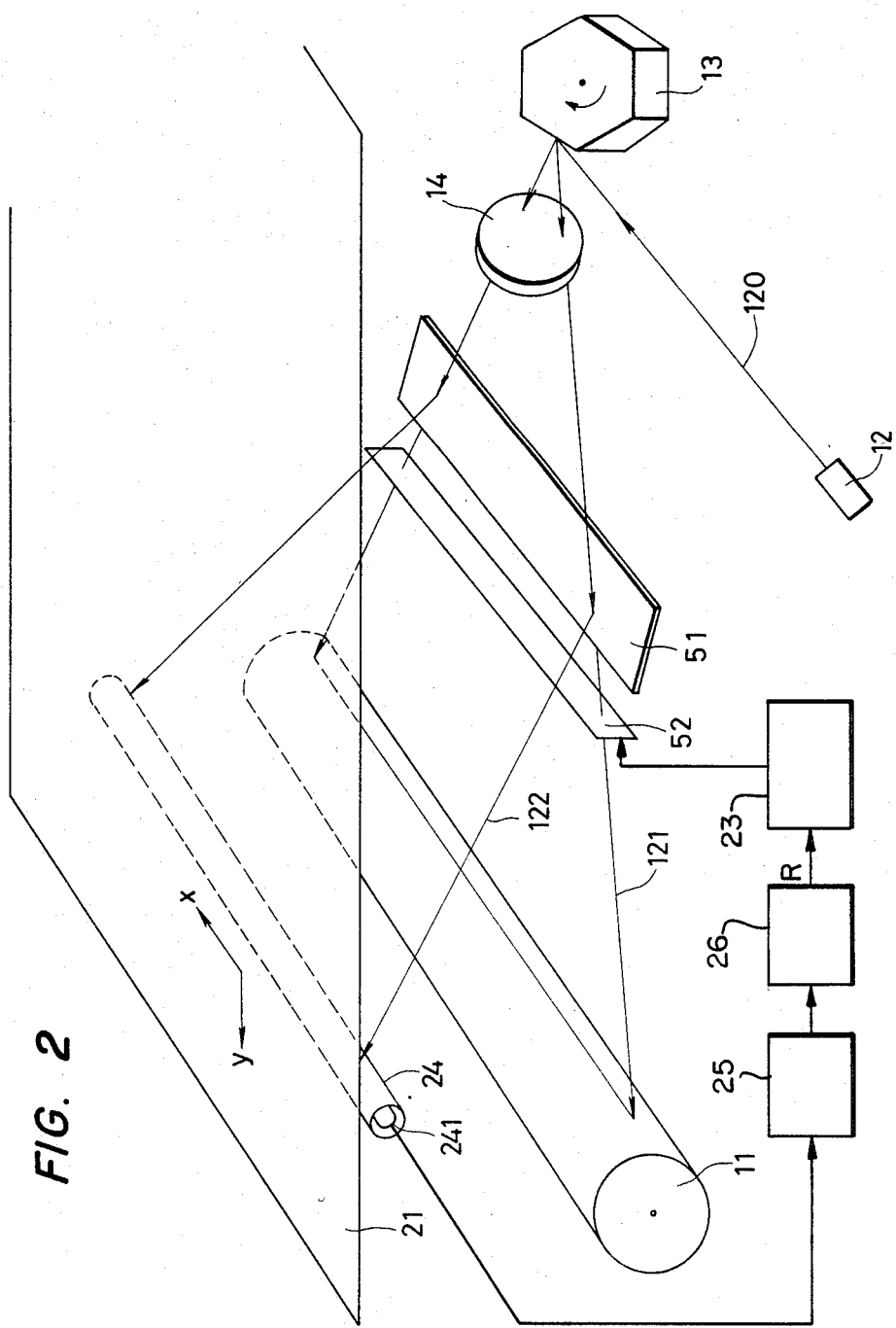
FIGS. 2 and 3 are views showing embodiments of the present invention.

FIG. 2 shows a first embodiment of the present invention. In FIG. 2, a plane mirror 51 is a translucenmirror which has a function to allow a portion of an incident beam to pass therethrough and to reflect the remainder of the incident beam and by which the incident beam can be separated in two directions.

First of all, in case the image input and output device of the present invention is operated as the laser printer, the beam having passed through the aforementioned translucent mirror 51 is used as a laser beam 121, when an electronic shutter 52 is opened, to irradiate the photo-conductive drum 11.

In case the device of the present invention is operated as the image input device, on the other hand, a photoelectric converter 24 in a state, in which it receives the beam reflected from the surface of an original 21 being irradiated with a laser beam 122 reflected by the aforementioned translucent mirror 51 while the original 21 is moved in a y-axis direction, may be driven by a drive circuit (although not shown) so that the signals photoelectrically converted may be fed out to an external circuit (e.g., an A/D converter 25 of FIG. 2).

As the aforementioned electronic shutter 52, incidentally, there may be used a ferroelectric material or the like, which can have its transparency electronically changed. A signal for opening and closing that shutter 52 is generated by controlling the intensity of the drive signal, which is generated by a laser control circuit 23 of FIG. 2, for example, in accordance with an output signal R coming from a memory 26.

According to the construction of FIG. 2, moreover, the image input operation and the image output (of the printer) operation can be conducted in parallel (i.e., in a time division manner). As a result, if the photoelectrically converted signal generated by the image input operation is used as it is as the intensity control signal of the aforementioned electronic shutter, a hard copy of the original received can be produced even without the aforementioned memory.

Figure 3:
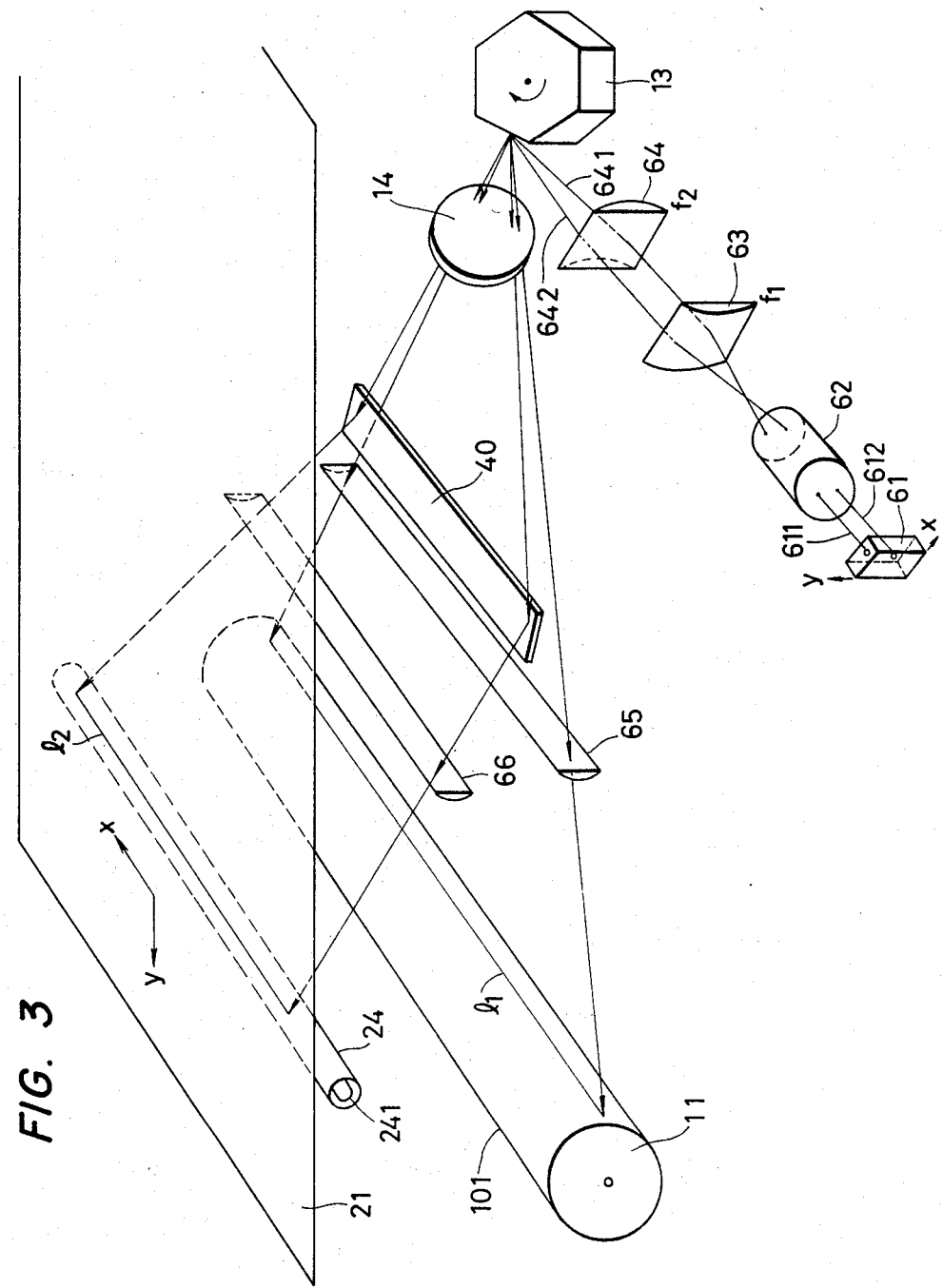

FIG. 3 shows a second embodiment of the present invention, which is characterized in that two (or usually a plurality of) laser beam sources and one optical system common between those beam sources are used such that one of the beam source is used for the image input whereas the other is used for the image output (of the printer) so that the image input and output can be simultaneously effected by the construction using only the fixed plane mirror even without any optical system having the combination of the half mirror 51 and the electronic shutter 52 of FIG. 2.

In FIG. 3, two laser beams 611 and 612, which are emitted from a semiconductor laser array beam source 61 positioned in an x-y plane shown in the same Figure, are rearranged into parallel beams by the action of a coupling lens 62 for compensating the divergences of the respective beams thereby to enhance the beam using efficiency. The resultant parallel beams 611 and 612 are made to pass through both a cylindrical lens 63 (which has a focal length $f_1$) for changing the size (dx) of those beam section in the x-axis direction and a cylindrical lens 64 (which has a focal length $f_2$) for changing the size (dy) of the same in the y-axis direction into beams 641 and 642, which have been shaped into beams having desired sectional shapes, until they enter the polygon reflector 13.

Incidentally, the sizes of the beam section in the x-axis and y-axis directions immediately after the beams are emitted from the aforementioned beam source 61 are designated at $d_{ox}$ and $d_{oy}$, respectively, the following equation holds:

$$dx/dy = (f_1/f_2) \cdot d_{ox}/d_{oy}.$$

Hence, in order that a beam may be converged into a small beam spot to enter the polygon reflector 13, the ratios of $f_1/f_2$ and $d_{ox}/d_{oy}$ may be set to satisfy the following relationship:

$$dx/dy \simeq 9 \pm 1.$$

The two laser beams reflected by the polygon reflector 13 respectively pass through the $F\theta$ lens 14. After that, one beam reaches the photo-conductive drum 11 through a correcting lens 65 and shifts in a horizontal direction (i.e., the x-axis direction) along a straight line $l_1$ in the drum surface 101.

The other beam is reflected by a plane reflector 40 to reach the original 21 in a changed direction through a correcting lens 66 and also shifts in the x-axis direction along a straight line $l_2$ in the original 21. The reflected beam is received by the photoelectric surface 241 of the photoelectric converter 24.

Here, since the beam incident upon the aforementioned polygon reflector 13 is not one but the two beams 641 and 642, these beams have to enter either the upper or lower side of the rotary plane (which is at a right angle with respect to the surfaces of the reflective reflectors) of the aforementioned reflector 13. As a result, the loci of the beam spots on both the drum surface 101 and the original 21 are shifted from the aforementioned straight lines $l_1$ and $l_2$ so that they are curved in arcuate shapes, for example.

The aforementioned correcting lenses 65 and 66 are inserted to prevent those curvatures.

Incidentally, similarly to the case of FIG. 2, even in the construction of FIG. 3, the intensity of the drive signal of the image output (or the printer) laser beam of the laser array beam source is controlled in accordance with either the output signal R from the memory 26 of FIG. 2 or the photoelectrically converted signal generated by the image input operation so that the hard copy can be produced while effecting the image input.

As has been described hereinbefore, according to the present invention, it is possible to realize a small but fast input and output device which commonly uses the optical system of a printer using the laser beam.

As shown in FIGS. 2 and 3, moreover, since the input and output operations can be effected simultaneously and independently, there can be obtained a high effect that the copying operation can be speeded up in case the number of originals is large.

What is claimed is:

1. An optical input and output scanning system comprising: generating means for generating a laser light in the form of a beam; a photo-conductive drum adapted to be formed with an electro-latent image according to the intensity of said laser light; a sheet of paper carrying a picture image to be received; scanning means including an optical system for condensing said laser light upon said photo-conductive drum and said paper to linearly scan the surfaces of said photo-conductive drum and said paper; and photoelectric converting means for receiving the laser light reflected from the paper surface scanned by said scanning means and for generating an electric signal according to the intensity of the light received, said scanning means including optical means for reflecting and deflecting the laser light generated by said generating means and distributing optical means for simultaneously distributing the reflected and deflected beam of laser light between said photo-conductive drum surface and said paper surface thereby to irradiate the same, said distributing optical means including a half mirror for reflecting a portion of the deflected incident beam of laser light and allowing the other portion of the same to transmit therethrough; and an optical shutter interposed between said half mirror and said photo-conductive drum for enabling one of passing and blocking of said laser light to said photo-conductive drum.

2. A scanning system as set forth in claim 1, wherein said optical means includes a rotary polygon reflector.

3. A scanning system as set forth in claim 1, wherein said shutter is responsive to a signal corresponding to the output electric signal from said photoelectric converting means for passing and blocking the laser light to said photo-conductive drum.

4. A scanning system as set forth in claim 1 or 3, wherein said distributing optical means further includes an optical lens for correcting the optical differential path for the laser light to reach said photo-conductive drum surface and said paper surface.

5. A scanning system as set forth in claim 1, wherein said optical means includes a rotary polygon reflector, and said generating means includes a single laser source for generating a single laser light beam, said laser light beam being directly applied to said rotary polygon reflector.

* * * * *